April 12, 1955     J. M. LACHER     2,705,824

CABLE TAKE-UP DEVICE

Filed June 22, 1951

INVENTOR.

John M. Lacher,

BY *Schroeder, Merriam,*
*Hofgren & Brady*
              Attys.

United States Patent Office 2,705,824
Patented Apr. 12, 1955

2,705,824

CABLE TAKE-UP DEVICE

John M. Lacher, Omaha, Nebr., assignor to Lacher Products, Inc., a corporation of Nebraska Application June 22, 1951, Serial No. 232,907

7 Claims. (Cl. 24—71.1)

This invention relates to take-up devices for adjusting the length of a flexible cord, such as the stranded cables on the brakes of automobiles. Steel cables are normally attached to the devices which they operate by means of shackles which usually have some sort of adjusting means at their ends to take care of stretch. However, it is usually difficult to operate the adjusting mechanism and frequently it is placed in a position that is not conveniently accessible.

The primary object of the present invention is to provide a very simple and inexpensive take-up device which may be installed in any convenient place along the length of the cable without disturbing the end fastenings.

A further object of the invention is to provide a device which may be adjusted readily, after it has been installed, and may be locked so that its adjustment will not be disturbed by loosening due to vibration or long use.

A further object of the invention is to provide a cable take-up device having a one-piece base member which is stamped from sheet metal and is in a very rigid form so that it is not readily bent under the stresses normally applied to it.

Figure 1:
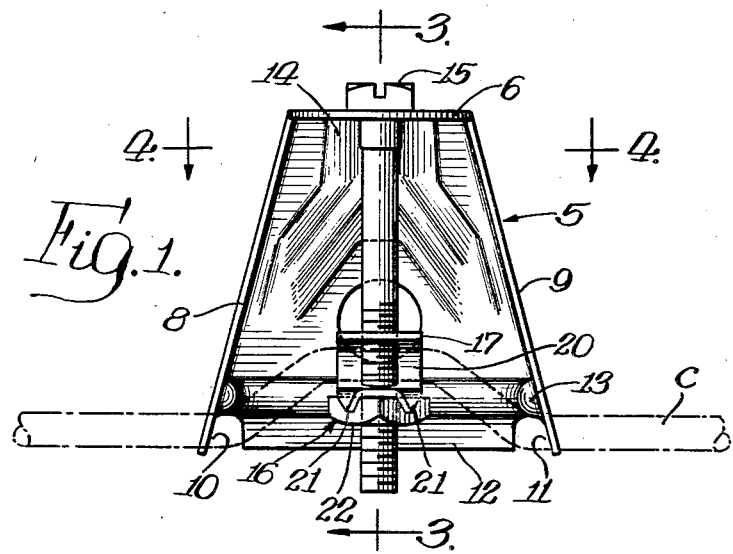
Figure 2:
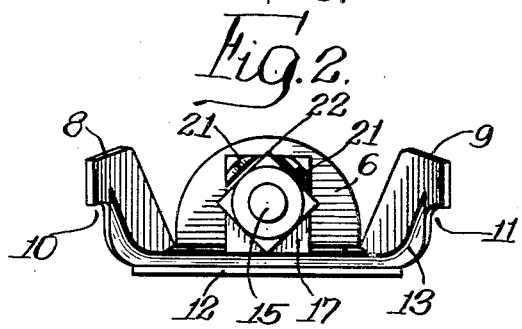
Figure 3:
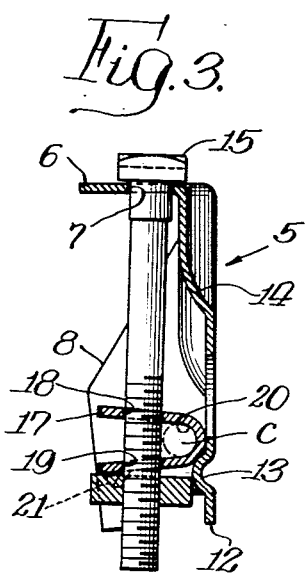
Figure 4:
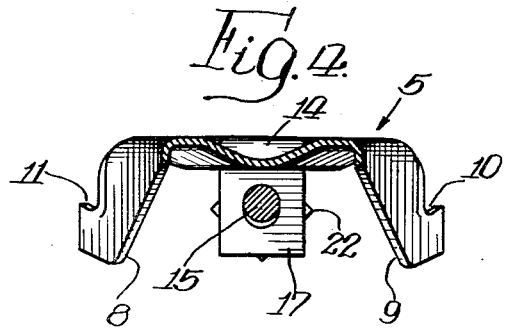

The invention is illustrated in the preferred embodiment in the accompanying drawings, in which:

Fig. 1 is a front elevation of the improved take-up device; Fig. 2 is a plan view thereof as seen from the bottom of Fig. 1; Fig. 3 is a sectional view taken as indicated along the line 3—3 of Fig. 1; and Fig. 4 is a sectional view taken as indicated along line 4—4 of Fig. 1.

In the embodiment illustrated, a base member, indicated generally at 5, is provided at one end with a flange 6 having an aperture 7, and has a pair of projecting wings 8 and 9 extending along its side margins from the flange 6, said wings having recesses 10 and 11, respectively, which are formed at the juncture of the wings and the margin 12 of the base member which is opposite the flange 6. A rounded rib 13 is pressed into the base member 5 and the wings 8 and 9 at the bottoms of the recesses 10 and 11, so as to afford rounded surfaces at the bottoms of said recesses against which a cable (shown in broken lines and indicated as C) may bear. The base member 5 also has a Y-shaped strengthening rib 14 pressed into it, the stem of the Y extending from the margin of the aperture 7 in the flange 6.

An adjusting bolt 15 extends through the aperture 7 toward the edge 12 of the base member, and hook-like slide means indicated generally at 16 is carried on said adjusting bolt. The slide means includes a U-shaped clevis member 17 which has registering apertures 18 and 19 in its arms through which the adjusting bolt 15 passes, a closed cable receiving eye portion 20 which is formed between the base of the U and the adjusting bolt and which lies between the bolt and the base member, and an internally threaded square nut 22 to be threaded on the adjusting bolt. The arm of the clevis member 17 which is more remote from the flange 6, is provided with a pair of ears 21 which interlock with the square nut 22 to prevent relative rotation of the nut and the clevis member. As best seen in Fig. 2, the nut 22 has one corner caught between the ears 21 and has its opposite corner extending beneath the cable receiving portion 20 of the clevis member to reinforce that portion and reduce the likelihood that the clevis member will bend when tension is placed on a cable.

The use of the cable take-up device is believed to be plain from the foregoing description. In order to apply the device to a cable, the clevis member 17 and nut 22 are removed from the adjusting bolt 15 and the clevis member is placed in position with its arms flanking the cable C as shown in Fig. 3, after which the clevis member and nut are replaced upon the adjusting bolt and drawn up by turning the bolt. As the clevis member travels toward the flange 6, the cable receiving channels 10 and 11 are engaged with the cable as seen in Fig. 1, and further adjustment of the bolt 15 to draw the clevis member toward the flange 6 forms a bight in the cable so as to remove any slack from the cable. As the cable stretches, any additional slack may be readily taken up by turning the adjusting bolt 15.

The Y-shaped rib 14 stiffens the entire base member 5, and in particular reinforces the flange 6; and the flanking wings 8 and 9 also reinforce the base member 5. Since the thrust of the cable is taken longitudinally of the wings 8 and 9, there is no bending stress on the wings; and the positioning of the square nut 22 with respect to the clevis member 17 reinforces the cable receiving portion of the clevis member. Positioning the cable receiving portion of the clevis member between the adjusting bolt 15 and the base member 5 provides a compact unit in which force is applied to the cable very close to the face of the base member so as to minimize the tendency of that force to bend the base member. Also, the rounded base of the U-shaped clevis member 17 rides along the face of the base member so as to eliminate any tendency to bend the adjusting bolt 15.

The foregoing detailed description is given for clearness of understanding only and no unnecessary limitations should be understood therefrom, for some modification will be obvious to those skilled in the art.

I claim:

1. A cable take-up device comprising: a base member having a flange at one margin with an aperture closely adjacent the base member; a pair of cable guiding channels spaced from said flange and lying between the plane of said base member and a plane parallel thereto and passing through the aperture in said flange; a threaded adjusting bolt which has its head engaging the flange and which extends loosely through the aperture in the flange and longitudinally of said base member; and hook-like slide means including a portion which is threaded to screw on said bolt, said slide means including a U-shaped portion the spaced arms of which are impaled by the bolt to provide a closed cable-receiving eye between the bolt and the base member.

2. The cable take-up device of claim 1 in which a longitudinally extending Y-shaped rib is pressed into the base member, with the stem of the Y extending from the margin of the aperture in the flange.

3. A cable take-up device comprising: a base member having a flange at one margin with an aperture closely adjacent the base member; a pair of cable guiding channels spaced from said flange and lying between the plane of said base member and a plane parallel thereto and passing through the aperture in said flange; a threaded adjusting bolt which has its head engaging the flange and which extends loosely through the aperture in the flange and longitudinally of the base member; a U-shaped clevis member which has its base between the base member and the bolt; said clevis member having apertures in its spaced arms to loosely receive the adjusting bolt and being adapted to receive a cable in the eye formed by its closed side and the bolt; and a threaded nut abutting the arm of the clevis member remote from the flange on the base member, there being interengaging means on the clevis member and on the nut to lock the nut against rotation relative to the clevis member.

4. The cable take-up device of claim 3 in which the clevis member has a pair of projecting ears and the nut is square with one corner caught between said ears and the opposite corner reinforcing the cable receiving eye of the clevis member.

5. A cable take-up device comprising: a base member having a flange at one margin with an aperture closely adjacent the base member; a pair of cable guiding channels spaced from said flange and lying between the plane of said base member and a plane parallel thereto and passing through the aperture in said flange; a pair of integral wings flanking the base member, each of which has a recess adjacent the margin of the base member opposite said flange to form spaced cable guiding channels which lie between the plane of said base member and a plane parallel thereto and passing through the aperture in said flange, said channels having at their bottoms broad bearing surfaces for a cable; a threaded adjusting bolt which has its head engaging the flange and which projects loosely through the aperture in the flange and extends generally parallel to said base member; and hook like slide means including a portion which is threaded to screw on said bolt, said slide means including a U-shaped portion which has its base between the base member and the bolt, the spaced arms of said U-shaped portion being impaled by the bolt to provide a closed cable receiving eye between the bolt and the base member.

6. The cable take-up device of claim 5 in which the hook like slide means includes a clevis member having a pair of projecting ears and a square nut which has one corner caught between said ears and the opposite corner reinforcing the cable receiving eye of the clevis member.

7. The cable take-up device of claim 5 in which a rib is pressed into the wings and the base member to provide the bearing surfaces at the bottom of the cable guiding channels.

References Cited in the file of this patent

UNITED STATES PATENTS

| | | |
|---|---|---|
| 710,776 | Hobart | Oct. 7, 1902 |
| 763,445 | Vogelsand | June 28, 1904 |
| 810,232 | Thomas | Jan. 10, 1906 |
| 1,957,367 | Suydam | May 1, 1934 |
| 2,188,937 | Bertram | Feb. 6, 1940 |
| 2,567,270 | Belich | Sept. 11, 1951 |

FOREIGN PATENTS

| | | |
|---|---|---|
| 1,511 of 1926 | Australia | Apr. 20, 1927 |